(12) United States Patent
Itoh et al.

(10) Patent No.: US 10,167,962 B2
(45) Date of Patent: Jan. 1, 2019

(54) ELECTROMAGNETIC VALVE

(71) Applicant: CKD CORPORATION, Komaki-shi, Aichi (JP)

(72) Inventors: Shinji Itoh, Komaki (JP); Kiyotoki Natsume, Komaki (JP); Atsushi Fukuta, Komaki (JP)

(73) Assignee: CKD CORPORATION, Komaki-Shi, Aichi (JP)

( * ) Notice: Subject to any disclaimer, the term of this patent is extended or adjusted under 35 U.S.C. 154(b) by 0 days.

(21) Appl. No.: 15/801,006

(22) Filed: Nov. 1, 2017

(65) Prior Publication Data

US 2018/0128385 A1    May 10, 2018

(30) Foreign Application Priority Data

Nov. 8, 2016  (JP) .................................. 2016-218136

(51) Int. Cl.

| | |
|---|---|
| *F16K 11/07* | (2006.01) |
| *F16K 31/42* | (2006.01) |
| *F16K 37/00* | (2006.01) |
| *F16K 27/04* | (2006.01) |
| *F16K 31/06* | (2006.01) |

(52) U.S. Cl.
CPC ........ *F16K 11/0712* (2013.01); *F16K 27/041* (2013.01); *F16K 27/048* (2013.01); *F16K 31/0679* (2013.01); *F16K 31/426* (2013.01); *F16K 37/005* (2013.01);
(Continued)

(58) Field of Classification Search
CPC ......... Y10T 137/8175; Y10T 137/8242; Y10T 137/8326; Y10T 137/86614; Y10T 137/86622; Y10T 137/8663; Y10T 137/87885; F16K 11/0712; F16K 27/041;
(Continued)

(56) References Cited

U.S. PATENT DOCUMENTS

| | | | | |
|---|---|---|---|---|
| 4,796,661 A | * | 1/1989 | Hishinuma | ........ G05D 16/2093 137/487.5 |
| 5,806,565 A | * | 9/1998 | Kadlicko | ............ F15B 13/0402 137/625.63 |

(Continued)

FOREIGN PATENT DOCUMENTS

JP   4072756 B2   2/2004

*Primary Examiner* — Craig J Price
(74) *Attorney, Agent, or Firm* — James R. Gourley; Carstens & Cahoon, LLP

(57) ABSTRACT

An electromagnetic valve includes a valve casing, which has a valve hole, a spool valve in the valve hole, first and second output ports each communicating with the valve hole, first and second pressure introduction holes, which respectively communicate with the first and second output ports, first and second pressure sensors, which is respectively fitted in the first and second pressure introduction holes, sealing members, which are arranged between the respective pressure sensors and the pressure introduction holes, first and second substrates, on which the corresponding first and second pressure sensors are mounted, and a housing, which accommodates the first and second substrates, has the first and second pressure introduction holes, and is attached to the valve casing. The first and second substrates are arranged to be opposed to each other in a state of being upright in a direction perpendicular to the movement direction of the spool valve.

4 Claims, 5 Drawing Sheets

(52) U.S. Cl.
 CPC .. *Y10T 137/8326* (2015.04); *Y10T 137/86614* (2015.04); *Y10T 137/87885* (2015.04)
(58) Field of Classification Search
 CPC .. F16K 27/048; F16K 31/0679; F16K 31/426; F16K 37/005
 USPC ............. 137/552, 554, 557, 625.64, 625.65, 137/625.69, 884; 73/756
 See application file for complete search history.

(56) References Cited

U.S. PATENT DOCUMENTS

| | | | |
|---|---|---|---|
| 6,612,332 B2* | 9/2003 | Miyazoe | F15B 13/0431 137/552 |
| 6,840,273 B2* | 1/2005 | Miyazoe | F15B 13/0402 137/315.03 |
| 6,913,037 B2* | 7/2005 | Miyazoe | F15B 13/0817 137/557 |
| 6,923,207 B2* | 8/2005 | Misumi | F15B 13/0402 137/552 |
| 9,151,396 B2* | 10/2015 | Nalgirkar | F15B 13/086 |
| 9,557,059 B2* | 1/2017 | Kucera | F23N 1/002 |

* cited by examiner

ELECTROMAGNETIC VALVE

CROSS-REFERENCE TO RELATED APPLICATIONS

This application claims all benefits accruing under 35 U.S.C. § 119 from Japanese Patent Application No. 2016-218136, filed Nov. 8, 2016 in the Japan Patent Office, the content of which is hereby incorporated by reference.

BACKGROUND OF THE INVENTION

The present invention relates to an electromagnetic valve.

An electromagnetic valve includes a valve casing, which has a valve hole, a spool valve, which is accommodated in the valve hole in a reciprocally movable manner, a supply port, a first output port, a second output port, and a discharge port. The supply port, the first output port, the second output port, and the discharge port communicate with the valve hole. The spool valve reciprocates in the valve hole to switch between a first switching position and a second switching position. When the spool valve is located at the first switching position, the supply port and the first output port communicate with each other and the second output port and the discharge port communicate with each other. When the spool valve is located at the second switching position, the supply port and the second output port communicate with each other and the first output port and the discharge port communicate with each other.

For the electromagnetic valve, as disclosed in Japanese Patent No. 4072756, for example, there is a method that uses pressure sensors to detect the operating state of the spool valve. In the electromagnetic valve of the aforementioned publication, a first pressure sensor and a second pressure sensor are mounted on a single substrate. The first pressure sensor is fitted in a first pressure introduction hole, which communicates with the first output port. A first sealing member is arranged between the first pressure sensor and the first pressure introduction hole. The first sealing member thus prevents leakage of fluid from between the first pressure sensor and the first pressure introduction hole. The first pressure sensor detects the pressure of the fluid output from the first output port. Similarly, the second pressure sensor is fitted in a second pressure introduction hole, which communicates with the second output port. A second sealing member is arranged between the second pressure sensor and the second pressure introduction hole. The second sealing member thus prevents leakage of fluid from between the second pressure sensor and the second pressure introduction hole. The second pressure sensor detects the pressure of the fluid output from the second output port.

In the electromagnetic valve of the aforementioned publication, the single substrate, on which the first and second pressure sensors are mounted, is arranged such that the first pressure sensor and the second pressure sensor are fitted in the first pressure introduction hole and the second pressure introduction hole, respectively. Therefore, errors exist in the distance between the first pressure sensor and the second pressure sensor and in the distance between the first pressure introduction hole and the second pressure introduction hole, the axis of each of the first and second pressure sensors may be offset from the axis of the associated one of the first and second pressure introduction holes. This lowers the sealing performance of the first and second sealing members. Also, when the first pressure sensor and the second pressure sensor are mounted on a single substrate, the substrate has an enlarged planar size. This enlarges the size of the electromagnetic valve in the planar direction of the substrate. Additionally, improvement in the ease of maintenance of the electromagnetic valve is desired.

SUMMARY OF THE INVENTION

Accordingly, it is an objective of the present invention to provide an electromagnetic valve that enhances the sealing performance of a first sealing member and a second sealing member, has a reduced size, and improves the ease of maintenance.

To achieve the foregoing objective and in accordance with one aspect of the present invention, an electromagnetic valve is provided that includes a valve casing, a spool valve, a supply port, a first output port, a second output port, a discharge port, a first pressure introduction hole, a second pressure introduction hole, a first pressure sensor, a second pressure sensor, a first sealing member, a second sealing member, a first substrate, a second substrate, a housing. The valve casing has a valve hole. The spool valve is accommodated in the valve hole in a reciprocally movable manner. The supply port, the first output port, the second output port, and the discharge port each communicate with the valve hole. The first pressure introduction hole communicates with the first output port. The second pressure introduction hole communicates with the second output port. The first pressure sensor is fitted in the first pressure introduction hole and is configured to detect a pressure of a fluid output from the first output port. The second pressure sensor is fitted in the second pressure introduction hole and is configured to detect a pressure of a fluid output from the second output port. The first sealing member is arranged between the first pressure sensor and an inner wall surface of the first pressure introduction hole. The second sealing member is arranged between the second pressure sensor and an inner wall surface of the second pressure introduction hole. The first pressure sensor is mounted on the first substrate. The second pressure sensor is mounted on the second substrate. The housing accommodates the first substrate and the second substrate, has the first pressure introduction hole and the second pressure introduction hole, and is attached to the valve casing. The first substrate and the second substrate are arranged to be opposed to each other in a state of being upright in a direction perpendicular to a movement direction of the spool valve.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An electromagnetic valve 10 according to one embodiment will now be described with reference to FIGS. 1 to 6.

Figure 1:
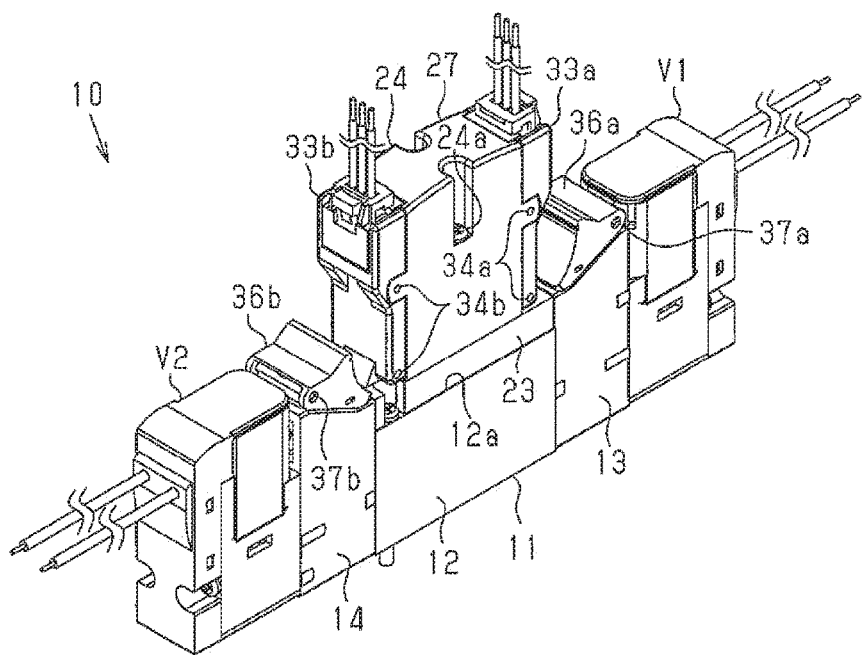
FIG. 1 is a perspective view showing an electromagnetic valve according to one embodiment.
Figure 2:
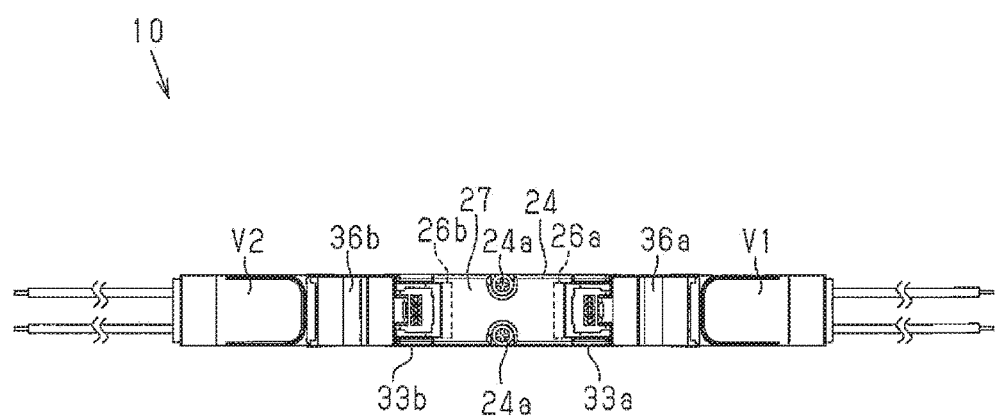
FIG. 2 is a plan view showing the electromagnetic valve of FIG. 1.

With reference to FIGS. 1 and 2, the electromagnetic valve 10 includes a valve casing 11, a first pilot valve portion V1, and a second pilot valve portion V2. The valve casing 11 is shaped substantially as a rectangular parallelepiped. The first pilot valve portion V1 is arranged at a first end in the longitudinal direction of the valve casing 11. The second pilot valve portion V2 is arranged at a second end in the longitudinal direction of the valve casing 11.

Figure 3:
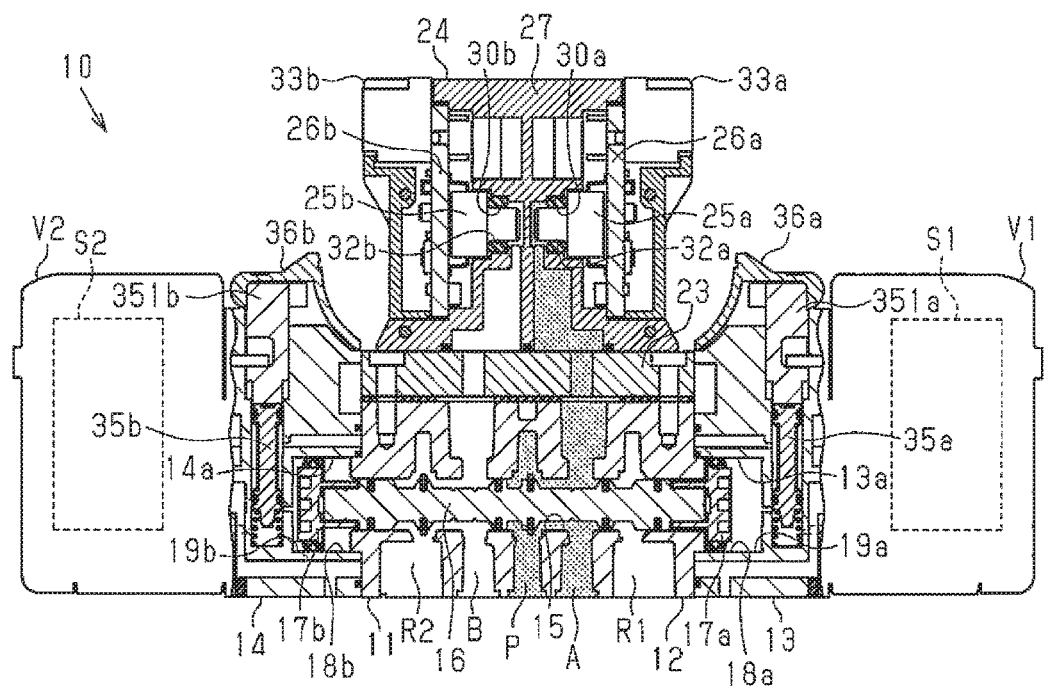
FIG. 3 is a cross-sectional view showing a state in which the spool valve of the electromagnetic valve of FIG. 1 is located at the first switching position.

As shown in FIG. 3, the valve casing 11 has a valve body 12, which is shaped substantially as a rectangular parallelepiped, a first piston body 13, and a second piston body 14. The first piston body 13 and the second piston body 14 are joined to a first end and a second end in the longitudinal direction of the valve body 12, respectively. The valve body 12 has a valve hole 15. The valve hole 15 extends in the longitudinal direction of the valve body 12. A spool valve 16 is accommodated in the valve hole 15 in a reciprocally movable manner.

The valve body 12 has a supply port P, a first output port A, a second output port B, a first discharge port R1, and a second discharge port R2, each of which communicates with the valve hole 15. The supply port P, the first output port A, the second output port B, the first discharge port R1, and the second discharge port R2 are aligned sequentially in the order of the first discharge port R1, the first output port A, the supply port P, the second output port B, and the second discharge port R2 from the first end toward the second end in the longitudinal direction of the valve body 12. The electromagnetic valve 10 of the present embodiment includes at least one discharge port. The supply port P, the first output port A, the second output port B, the first discharge port R1, and the second discharge port R2 each have an inner end, which communicates with the valve hole 15, and an outer end, which opens in a side surface (the bottom surface) of the valve body 12.

A first piston 17a is arranged at a first axial end of the spool valve 16 in the axial direction. The valve casing 11 has a first piston chamber 18a, in which the first piston 17a is accommodated. The first piston chamber 18a is defined by a first end face in the longitudinal direction of the valve body 12 and a recess 13a of the first piston body 13. In the first piston chamber 18a, the first piston 17a defines a first pilot pressure acting chamber 19a.

A second piston 17b is arranged at a second axial end of the spool valve 16 in the axial direction. The valve casing 11 has a second piston chamber 18b, in which the second piston 17b is accommodated. The second piston chamber 18b is defined by a second end face in the longitudinal direction of the valve body 12 and a recess 14a of the second piston body 14. In the second piston chamber 18b, the second piston 17b defines a second pilot pressure acting chamber 19b.

The first pilot valve portion V1 includes a first electromagnetic driving portion S1, which controls pilot pressure. The first pilot valve portion V1 is a publicly known electromagnetic valve that opens when the first electromagnetic driving portion S1 is energized and closes when the first electromagnetic driving portion S1 is de-energized. The second pilot valve portion V2 includes a second electromagnetic driving portion S2, which controls pilot pressure. The second pilot valve portion V2 is a publicly known electromagnetic valve that opens when the second electromagnetic driving portion S2 is energized and closes when the second electromagnetic driving portion S2 is de-energized. The electromagnetic valve 10 of the present embodiment is a double-solenoid type, which has the first pilot valve portion V1 and the second pilot valve portion V2.

When the first electromagnetic driving portion S1 is energized and the second electromagnetic driving portion S2 is de-energized, the first pilot valve portion V1 opens and the second pilot valve portion V2 closes. This supplies pilot fluid to the first pilot pressure acting chamber 19a as the pilot pressure. Meanwhile, the pilot fluid in the second pilot pressure acting chamber 19b is discharged to the exterior through a discharge passage (not shown). Then, the pilot pressure of the pilot fluid that acts on the first piston 17a presses the first piston 17a toward the second piston chamber 18b, thus moving the spool valve 16 toward the second piston chamber 18b. In this manner, the spool valve 16 is switched to a first switching position, at which the supply port P and the first output port A communicate with each other and the second output port B and the second discharge port R2 communicate with each other. As a result, compressed air that is supplied from the supply port P as fluid is output to an actuator (not shown) through the first output port A.

Figure 4:
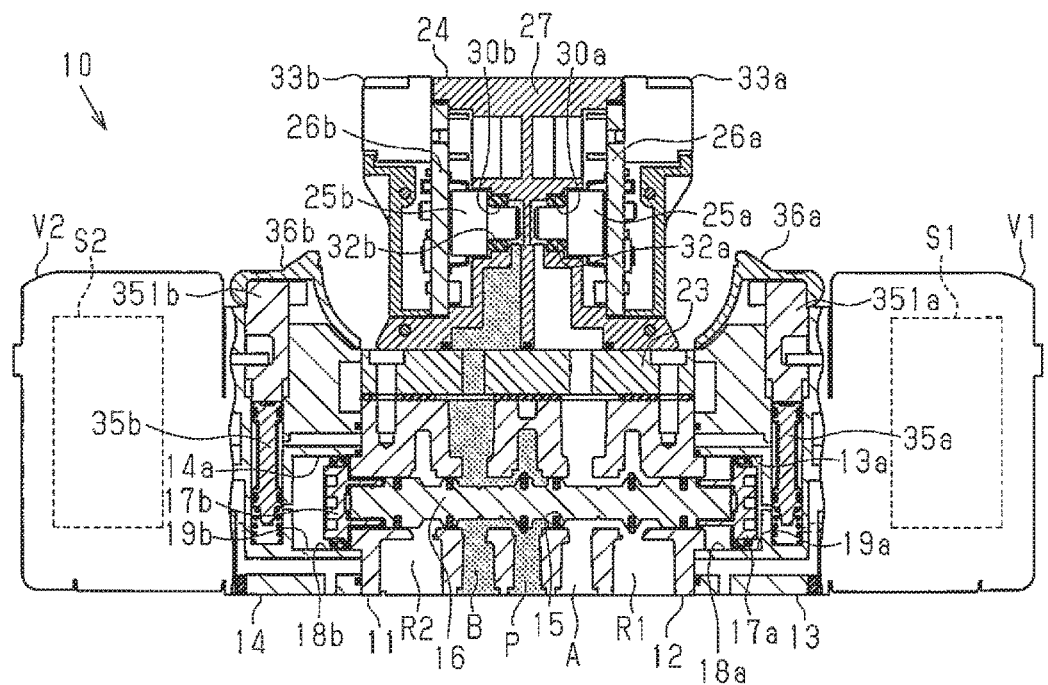
FIG. 4 is a cross-sectional view showing a state in which the spool valve of the electromagnetic valve of FIG. 1 is located at the second switching position.

Referring to FIG. 4, when the first electromagnetic driving portion S1 is de-energized and the second electromagnetic driving portion S2 is energized, the first pilot valve portion V1 closes and the second pilot valve portion V2 opens. This supplies pilot fluid to the second pilot pressure acting chamber 19b and the pilot fluid in the first pilot pressure acting chamber 19a is discharged to the exterior through a discharge passage (not shown). Then, the pilot pressure of the pilot fluid that acts on the second piston 17b presses the second piston 17b toward the first piston chamber 18a, thus moving the spool valve 16 toward the first piston chamber 18a. In this manner, the spool valve 16 is switched to a second switching position, at which the supply port P and the second output port B communicate with each other and the first output port A and the first discharge port R1 communicate with each other. As a result, the compressed air that is supplied from the supply port P is output to the actuator through the second output port B. In this manner, the spool valve 16 is reciprocated by the pilot fluid that is selectively supplied to and discharged from each of the first pilot pressure acting chamber 19a and the second pilot pressure acting chamber 19b.

Figure 5:
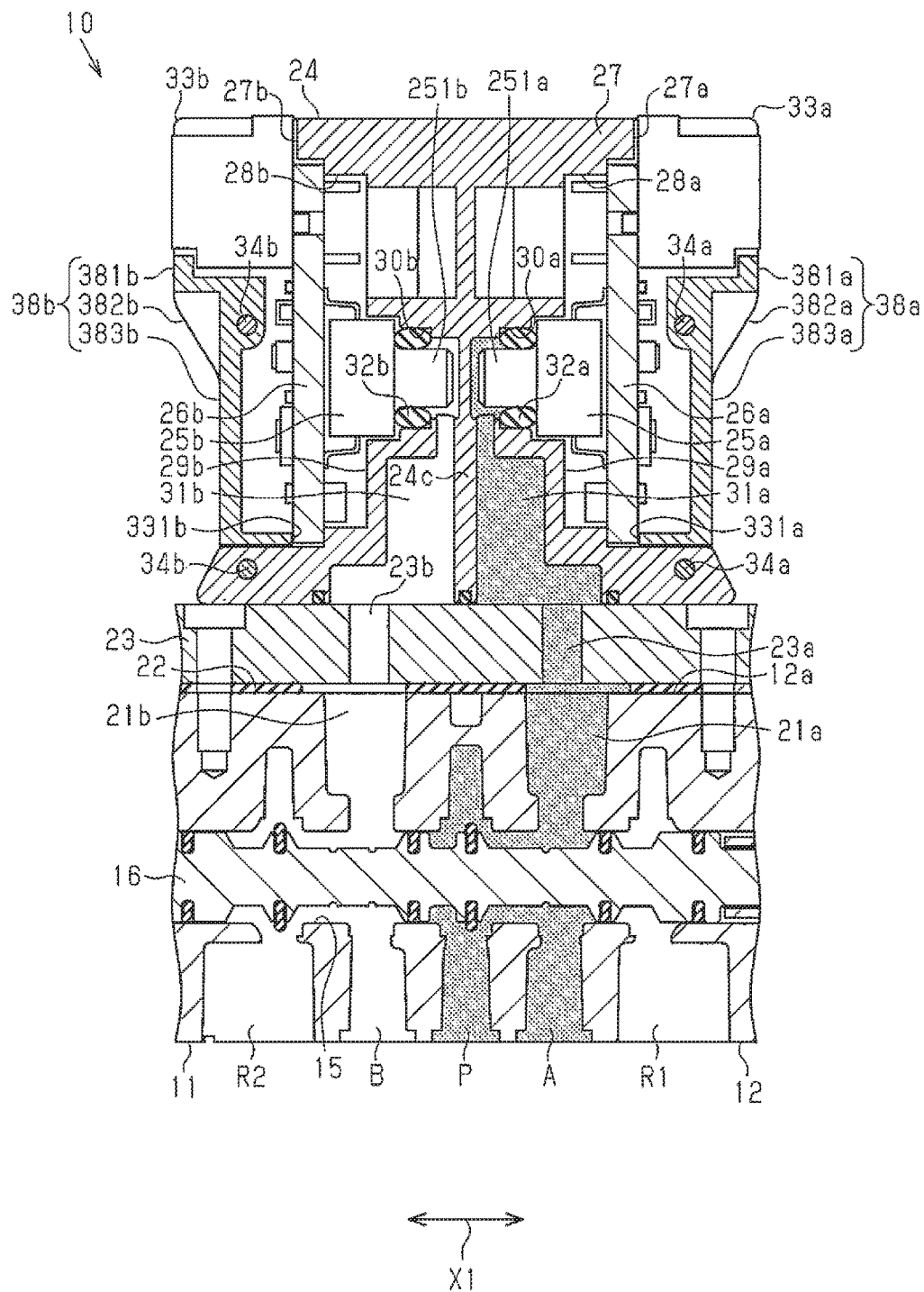
FIG. 5 is an enlarged cross-sectional view showing a section of the electromagnetic valve of FIG. 3.

As shown in FIG. 5, the valve body 12 has a first communication hole 21a, which communicates with the valve hole 15. The first communication hole 21a is arranged to be opposed to the first output port A with the valve hole 15 in between. The first communication hole 21a communicates with the first output port A through the valve hole 15. The first communication hole 21a has an inner end, which communicates with the valve hole 15, and an outer end, which opens in an upper surface 12a of the valve body 12. The upper surface 12a is the surface opposite to the bottom surface of the valve body 12 (which is the surface in which the outer ends of the ports P, A, B, R1, and R2 open). When the spool valve 16 is switched to the first switching position and the supply port P and the first output port A communicate with each other, the compressed air that flows from the supply port P to the valve hole 15 flows into the first communication hole 21a.

The valve body 12 has a second communication hole 21b, which communicates with the valve hole 15. The second communication hole 21b is arranged to be opposed to the second output port B with the valve hole 15 in between. The second communication hole 21b communicates with the second output port B through the valve hole 15. The second communication hole 21b has an inner end, which communicates with the valve hole 15, and an outer end, which opens in the upper surface 12a of the valve body 12. When the spool valve 16 is switched to the second switching position and the supply port P and the second output port B communicate with each other, the compressed air that flows from the supply port P to the valve hole 15 flows into the second communication hole 21b.

A plate-shaped spacer 23 is attached to the upper surface 12a of the valve body 12 through a plate-shaped gasket 22. The spacer 23 has a first through-hole 23a, which communicates with the first communication hole 21a. The compressed air that flows in the first communication hole 21a flows into the first through-hole 23a. The spacer 23 has a second through-hole 23b, which communicates with the second communication hole 21b. The compressed air that flows in the second communication hole 21b flows into the second through-hole 23b. The gasket 22 prevents leakage of the compressed air from between the upper surface 12a of the valve body 12 and the spacer 23.

A housing 24, which is shaped substantially as a rectangular parallelepiped, is attached to the opposite side of the spacer 23 from the valve body 12. The housing 24 is thus attached to the upper surface 12a of the valve body 12 with the spacer 23 and the gasket 22 in between. A first substrate 26a, on which a first pressure sensor 25a is mounted, and a second substrate 26b, on which a second pressure sensor 25b is mounted, are accommodated in the housing 24.

The housing 24 includes a main body 27, which is shaped substantially as a rectangular parallelepiped. The main body 27 has a first end face 27a and a second end face 27b at the opposite ends in the movement direction of the spool valve (the axial direction of the spool valve 16 indicated by arrow X1 in FIG. 5). A first accommodating recess 28a, in which the first substrate 26a is accommodated, is formed in the first end face 27a. The first substrate 26a is accommodated in the first accommodating recess 28a in a state of being upright in a direction perpendicular to the movement direction of the spool valve 16.

A bottom surface 29a of the first accommodating recess 28a extends in the direction perpendicular to the movement direction of the spool valve 16. A first pressure introduction hole 30a, in which the first pressure sensor 25a is fitted, opens in the bottom surface 29a of the first accommodating recess 28a. That is, the housing 24 has the first pressure introduction hole 30a. The first pressure introduction hole 30a extends in the movement direction of the spool valve 16.

A second accommodating recess 28b, in which the second substrate 26b is accommodated, is formed in the second end face 27b of the main body 27. The second substrate 26b is accommodated in the second accommodating recess 28b in a state of being upright in the direction perpendicular to the movement direction of the spool valve 16. That is, the first substrate 26a and the second substrate 26b are arranged to be opposed to each other in a state of being upright in the direction perpendicular to the movement direction of the spool valve 16.

A bottom surface 29b of the second accommodating recess 28b extends in the direction perpendicular to the movement direction of the spool valve 16. A second pressure introduction hole 30b, in which the second pressure sensor 25b is fitted, opens in the bottom surface 29b of the second accommodating recess 28b. That is, the housing 24 has the second pressure introduction hole 30b. The second pressure introduction hole 30b extends in the movement direction of the spool valve 16.

A partition wall 24c, which separates the first pressure introduction hole 30a and the second pressure introduction hole 30b from each other, is arranged in the housing 24. The first pressure sensor 25a projects toward the second substrate 26b and the second pressure sensor 25b projects toward the first substrate 26a. The first pressure sensor 25a and the second pressure sensor 25b, which are arranged on the opposite sides of the partition wall 24c, are aligned in the movement direction of the spool valve 16 and are opposed to a first surface and a second surface, respectively, of the partition wall 24c.

The partition wall 24c extends in the direction perpendicular to the movement direction of the spool valve 16. The partition wall 24c has an end section that contacts the spacer 23. The spacer 23 has an outer surface on the side opposite to the surface of the spacer 23 that contacts the valve body 12. The end section of the partition wall 24c contacts a section of the outer surface of the spacer 23 between the first through-hole 23a and the second through-hole 23b in the movement direction of the spool valve 16.

In the housing 24, a first introduction passage 31a is formed between the partition wall 24c and the first accommodating recess 28a. The first introduction passage 31a allows communication between the first through-hole 23a of the spacer 23 and an inner end (the end opposite to the outer end that opens in the first accommodating recess 28a) of the first pressure introduction hole 30a. The first output port A and the first pressure introduction hole 30a thus communicate with each other through the first communication hole 21a, the first through-hole 23a, and the first introduction passage 31a.

An annular first sealing member 32a is arranged between the first pressure sensor 25a and an inner wall surface of the first pressure introduction hole 30a. The first sealing member 32a is made of rubber. The first pressure sensor 25a has a detecting portion 251a, the distal end of which is located on the side of the first sealing member 32a that corresponds to the first introduction passage 31a (more specifically, on the side corresponding to the communicating portion between the first pressure introduction hole 30a and the first introduction passage 31a). The first sealing member 32a seals the gap between the first pressure sensor 25a and the inner wall surface of the first pressure introduction hole 30a in a state of being pressed and flattened between the first pressure sensor 25a and the inner wall surface of the first pressure introduction hole 30a. When the spool valve 16 is switched to the first switching position, compressed air flows from the valve hole 15 into the first pressure introduction hole 30a through the first communication hole 21a, the first through-hole 23a, and the first introduction passage 31a. The first sealing member 32a prevents leakage of the compressed air into the first accommodating recess 28a through the gap between the first pressure sensor 25a and the inner wall surface of the first pressure introduction hole 30a.

When the spool valve 16 is at the first switching position, the detecting portion 251a of the first pressure sensor 25a detects the pressure of the compressed air that flows from the valve hole 15 into the first pressure introduction hole 30a through the first communication hole 21a, the first through-hole 23a, and the first introduction passage 31a. The pressure of the compressed air that flows from the valve hole 15 into the first pressure introduction hole 30a through the first communication hole 21a, the first through-hole 23a, and the first introduction passage 31a is equal to the pressure of the compressed air that is output from the first output port A. Therefore, the detecting portion 251a of the first pressure sensor 25a detects the pressure of the compressed air that is output from the first output port A.

In the housing 24, a second introduction passage 31b is formed between the partition wall 24c and the second accommodating recess 28b. The second introduction passage 31b allows communication between the second through-hole 23b of the spacer 23 and an inner end (the end opposite to the outer end that opens in the second accommodating recess 28b) of the second pressure introduction hole 30b. The second output port B and the second pressure introduction hole 30b thus communicate with each other through the second communication hole 21b, the second through-hole 23b, and the second introduction passage 31b.

An annular second sealing member 32b is arranged between the second pressure sensor 25b and an inner wall surface of the second pressure introduction hole 30b. The second sealing member 32b is made of rubber. The second pressure sensor 25b has a detecting portion 251b, the distal end of which is located of the second sealing member 32b that corresponds to the second introduction passage 31b (more specifically, on the side corresponding to the communicating portion between the second pressure introduction hole 30b and the second introduction passage 31b). The second sealing member 32b seals the gap between the second pressure sensor 25b and the inner wall surface of the second pressure introduction hole 30b in a state of being pressed and flattened between the second pressure sensor 25b and the inner wall surface of the second pressure introduction hole 30b. When the spool valve 16 is switched to the second switching position, compressed air flows from the valve hole 15 into the second pressure introduction hole 30b through the second communication hole 21b, the second through-hole 23b, and the second introduction passage 31b. The second sealing member 32b prevents leakage of the compressed air into the second accommodating recess 28b through the gap between the second pressure sensor 25b and the inner wall surface of the second pressure introduction hole 30b.

When the spool valve 16 is at the second switching position, the detecting portion 251b of the second pressure sensor 25b detects the pressure of the compressed air that flows from the valve hole 15 into the second pressure introduction hole 30b through the second communication hole 21b, the second through-hole 23b, and the second introduction passage 31b. The pressure of the compressed air that flows from the valve hole 15 into the second pressure introduction hole 30b through the second communication hole 21b, the second through-hole 23b, and the second introduction passage 31b is equal to the pressure of the compressed air that is output from the second output port B. Therefore, the detecting portion 251b of the second pressure sensor 25b detects the pressure of the compressed air that is output from the second output port B.

The housing 24 has a first adapter 33a and a second adapter 33b, which are attached to the main body 27. The first adapter 33a closes the opening of the first accommodating recess 28a. The second adapter 33b closes the opening of the second accommodating recess 28b. The first adapter 33a and the second adapter 33b are attached to the main body 27 by means of a spring pin 34a and a spring pin 34b, respectively.

The first adapter 33a has an opening that opens toward the first substrate 26a. A peripheral edge 331a of the opening contacts the first substrate 26a. This prevents the first substrate 26a from projecting from the opening of the first accommodating recess 28a. The second adapter 33b has an opening that opens toward the second substrate 26b. A peripheral edge 331b of the opening contacts the second substrate 26b. This prevents the second substrate 26b from projecting from the opening of the second accommodating recess 28b.

In a state in which the first pressure sensor 25a is fitted in the first pressure introduction hole 30a, movement of the first pressure sensor 25a and the first substrate 26a in the direction perpendicular to the movement direction of the spool valve 16 is permitted in the range of elastic deformation of the first sealing member 32a. In a state in which the second pressure sensor 25b is fitted in the second pressure introduction hole 30b, movement of the second pressure sensor 25b and the second substrate 26b in the direction perpendicular to the movement direction of the spool valve 16 is permitted in the range of elastic deformation of the second sealing member 32b.

With reference to FIGS. 1 and 2, the housing 24 is attached to the valve body 12 by means of two attachment screws 24a. As illustrated in FIG. 2, the attachment screws 24a are arranged between the first substrate 26a and the second substrate 26b.

As shown in FIGS. 3 and 4, the first piston body 13 has a first manual shaft 35a, which is manually operated to control supply/discharge of the pilot fluid to and from the first pilot pressure acting chamber 19a. The first manual shaft 35a extends in the direction perpendicular to the movement direction of the spool valve 16. A manual-operation portion 351a of the first manual shaft 35a is located beside the housing 24 in the movement direction of the spool valve 16 and projects from the first piston body 13. The manual-operation portion 351a is separated from the housing 24 (close to the first pilot valve portion V1) in the movement direction of the spool valve 16.

The second piston body 14 has a second manual shaft 35b, which is manually operated to control supply/discharge of the pilot fluid to and from the second pilot pressure acting chamber 19b. The second manual shaft 35b extends in the direction perpendicular to the movement direction of the spool valve 16. A manual-operation portion 351b of the second manual shaft 35b is located beside the housing 24 in the movement direction of the spool valve 16 and projects from the second piston body 14. The manual-operation portion 351b is separated from the housing 24 (close to the second pilot valve portion V2) in the movement direction of the spool valve 16.

The electromagnetic valve 10 includes a first cover member 36a, which covers the manual-operation portion 351a of the first manual shaft 35a. Referring to FIG. 1, the first cover member 36a is attached to the first piston body 13 by means of a hinge pin 37a.

Figure 6:
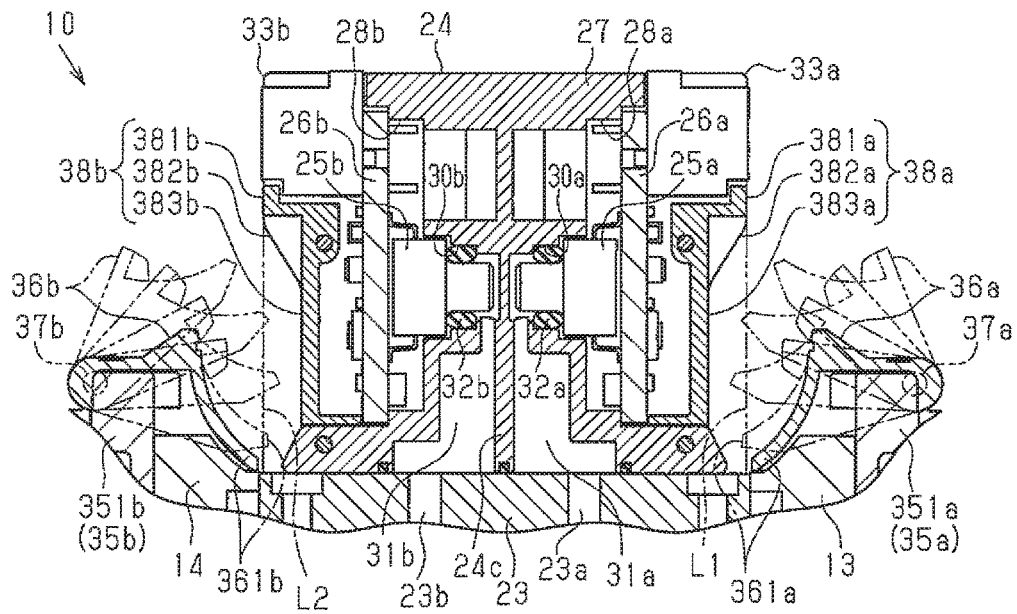
FIG. 6 is a cross-sectional view showing the movable range of the first cover member and the movable range of the second cover member of the electromagnetic valve of FIG. 1.

As shown in FIG. 6, the first cover member 36a is pivotal about the axis of the hinge pin 37a with respect to the first piston body 13 as indicated by the long dashed double-short dashed lines. A distal end 361a of the pivotal portion of the first cover member 36a, which pivots about the hinge pin 37a, is located on the side of the hinge pin 37a that corresponds to the housing 24.

The first adapter 33a has an outer side surface 38a, which faces the first cover member 36a. The outer side surface 38a has a first surface section 381a, an inclined surface section 382a, and a second surface section 383a. The first surface section 381a extends in the direction perpendicular to the movement direction of the spool valve 16 and is located at a position farther from the spacer 23 than the inclined surface section 382a and the second surface section 383a. The inclined surface section 382a is formed to be continuous with the end of the first surface section 381a that is closer to the spacer 23 and extends to become progressively separated from the first cover member 36a toward the spacer 23. The second surface section 383a is formed to be continuous with the end of the inclined surface section 382a that is closer to the spacer 23 and extends in the direction perpendicular to the movement direction of the spool valve 16.

The first surface section 381a is located at a position separated from the movable range of the first cover member 36a so as not to contact the distal end section 361a of the first cover member 36a, which pivots. An imaginary plane L1 is defined by imaginarily extending the first surface section 381a toward the spacer 23 in the direction perpendicular to the movement direction of the spool valve 16. The imaginary plane L1 overlaps with the movable range of the distal end section 361a. Since the inclined surface section 382a is inclined to become separated from the first cover member 36a, the inclined surface section 382a and the second surface section 383a are located at positions farther from the first cover member 36a than the imaginary plane L1. In this manner, the inclined surface section 382a and the second surface section 383a do not contact the distal end section 361a of the first cover member 36a when the first cover member 36a pivots. As a result, the outer side surface 38a of the first adapter 33a has the inclined surface section 382a and the second surface section 383a, each of which functions as an escape portion that prevents the outer side surface 38a from contacting the first cover member 36a when the first cover member 36a pivots.

As shown in FIGS. 3 and 4, the electromagnetic valve 10 includes a second cover member 36b, which covers the manual-operation portion 351b of the second manual shaft 35b. Referring to FIG. 1, the second cover member 36b is attached to the second piston body 14 by means of a hinge pin 37b.

With reference to FIG. 6, the second cover member 36b is pivotal about the axis of the hinge pin 37b with respect to the second piston body 14 as indicated by the long dashed double-short dashed lines. A distal end 361b of the pivotal portion of the second cover member 36b, which pivots about the axis of the hinge pin 37b, is located on the side of the hinge pin 37b that corresponds to the housing 24.

The second adapter 33b has an outer side surface 38b, which faces the second cover member 36b. The outer side surface 38b has a first surface section 381b, an inclined surface section 382b, and a second surface section 383b. The first surface section 381b extends in the direction perpendicular to the movement direction of the spool valve 16 and is located at a position farther from the spacer 23 than the inclined surface section 382b and the second surface section 383b. The inclined surface section 382b is formed to be continuous with the end of the first surface section 381b that is closer to the spacer 23 and extends to become progressively separated from the second cover member 36b toward the spacer 23. The second surface section 383b is formed to be continuous with the end of the inclined surface section 382b that is closer to the spacer 23 and extends in the direction perpendicular to the movement direction of the spool valve 16.

The first surface section 381b is located at a position separated from the movable range of the second cover member 36b so as not to contact the distal end section 361b of the second cover member 36b, which pivots. An imaginary plane L2 is defined by imaginarily extending the first surface section 381b toward the spacer 23 in the direction perpendicular to the movement direction of the spool valve 16. The imaginary plane L2 overlaps with the movable range of the distal end section 361b. Since the inclined surface section 382b is inclined to become separated from the second cover member 36b, the inclined surface section 382b and the second surface section 383b are located at positions farther from the second cover member 36b than the imaginary plane L2. In this manner, the inclined surface section 382b and the second surface section 383b do not contact the distal end section 361b of the second cover member 36b when the second cover member 36b pivots. As a result, the outer side surface 38b of the second adapter 33b has the inclined surface section 382b and the second surface section 383b, each of which functions as an escape portion that prevents the outer side surface 38b from contacting the second cover member 36b when the second cover member 36b pivots.

The operation of the present embodiment will now be described.

The first pressure sensor 25a is mounted on the first substrate 26a. The second pressure sensor 25b is mounted on the second substrate 26b. When the first pressure sensor 25a and the second pressure sensor 25b are fitted in the first pressure introduction hole 30a and the second pressure introduction hole 30b, respectively, the first sealing member 32a and the second sealing member 32b are elastically deformed. This facilitates the alignment of the axes of the first pressure sensor 25a and the second pressure sensor 25b with the axes the first pressure introduction hole 30a and the second pressure introduction hole 30b.

The above described-embodiment achieves the following advantages.

(1) The first pressure sensor 25a is mounted on the first substrate 26a and the second pressure sensor 25b is mounted on the second substrate 26b. When the first pressure sensor 25a and the second pressure sensor 25b are fitted in the first pressure introduction hole 30a and the second pressure introduction hole 30b, respectively, the first sealing member 32a and the second sealing member 32b are elastically deformed. This facilitates alignment of the axes of the first pressure sensor 25a and the second pressure sensor 25b with the axes of the first pressure introduction hole 30a and the second pressure introduction hole 30b, respectively. As a result, desirable sealing performance is ensured for the first sealing member 32a and the second sealing member 32b. Also, the first substrate 26a and the second substrate 26b are arranged to be opposed to each other in a state of being upright in the direction perpendicular to the movement direction of the spool valve 16. This reduces the size of the electromagnetic valve 10 in the planar direction of the first substrate 26a and the second substrate 26b, compared to, for example, a case in which the first substrate 26a and the second substrate 26b are arranged in the same plane. Further, the housing 24 is detachably attached to the valve body 12. To perform maintenance of the electromagnetic valve 10, the housing 24 is detached from the valve body 12 by removing the two attachment screws 24a. As a result, for example, the housing 24, which accommodates the first pressure sensor 25a and the second pressure sensor 25b, and the valve casing 11, which accommodates the spool valve 16, can be replaced as separate units. This improves the ease of maintenance.

(2) The first pressure sensor 25a projects toward the second substrate 26b and the second pressure sensor 25b projects toward the first substrate 26a. The two attachment screws 24a are arranged between the first substrate 26a and the second substrate 26b. This configuration reduces the size of the electromagnetic valve 10 compared to, for example, a case in which one of the two attachment screws 24a is arranged on the opposite side of the first substrate 26a from the first pressure sensor 25a and the other one of the attachment screws 24a is arranged on the opposite side of the second substrate 26b from the second pressure sensor 25b. Also, it is unnecessary to shape the first and second substrates 26a, 26b in a complicated manner to prevent the contact with the corresponding attachment screws 24a. The shapes of the first and second substrates 26a, 26b are thus simplified.

(3) The outer side surface 38a of the first adapter 33a has the inclined surface section 382a and the second surface section 383a, each of which functions as the escape portion that prevents the outer side surface 38a from contacting the first cover member 36a when the first cover member 36a pivots. The outer side surface 38b of the second adapter 33b has the inclined surface section 382b and the second surface section 383b, each of which functions as the escape portion that prevents the outer side surface 38b from contacting the second cover member 36b when the second cover member 36b pivots. The size of the electromagnetic valve 10 is thus reduced. Also, it is easy to create the space for operating the first cover member 36a and the space for operating the second cover member 36b. *This improves the ease of operation.*

The above-described embodiment may be modified as follows.

Figure 7:
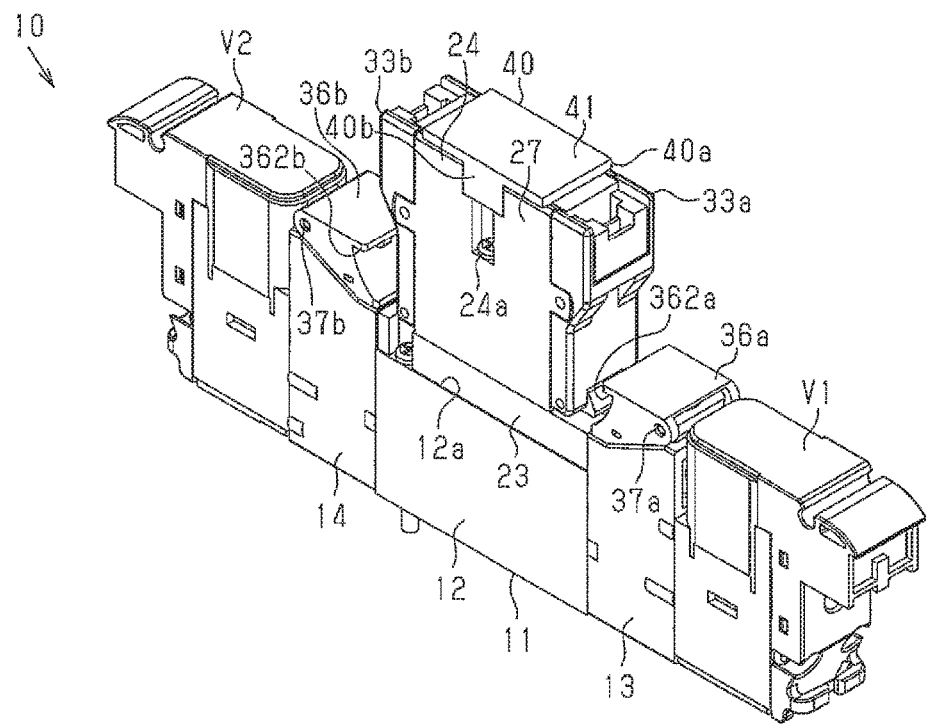
FIG. 7 is a perspective view showing an electromagnetic valve according to another embodiment.
Figure 8:
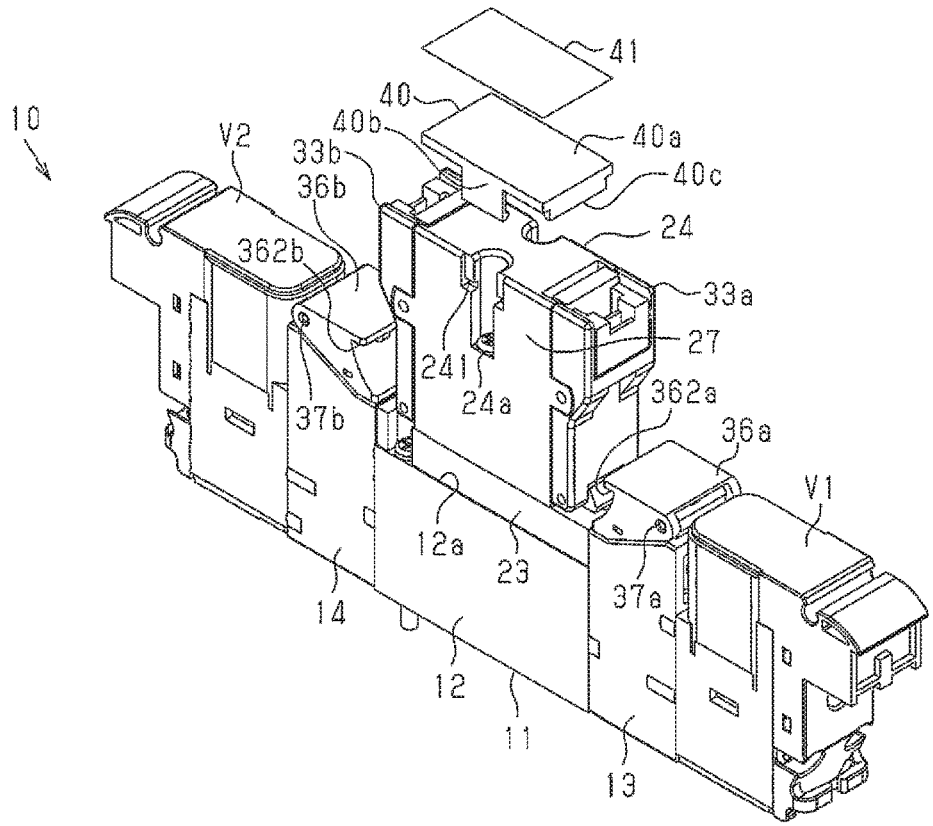
FIG. 8 is an exploded perspective view showing the electromagnetic valve of FIG. 7.

As illustrated in FIGS. 7 and 8, the electromagnetic valve 10 may include an operation member 40, which is used to operate the first cover member 36a and the second cover member 36b. The operation member 40 is shaped, for example, substantially as a rectangular parallelepiped and is attached to the upper end face of the housing 24, which is the end face opposite to the surface that contacts the spacer 23. The operation member 40 has a rectangular plate-shaped main body 40a, two engagement pieces 40b, and a catching portion 40c. The main body 40a is mounted on the upper end face of the housing 24. The engagement pieces 40b project from the opposite longitudinal-side edges of the main body 40a toward the housing (the spacer 23). The catching portion 40c projects from one of the short-side edges of the main body 40a toward the housing 24. A distal end of each of the engagement pieces 40b is shaped like a hook. The housing 24 has grooves 241, with each of which the distal end of the corresponding one of the engagement pieces 40b is engageable. By engaging the distal end of each engagement piece 40b with the corresponding groove 241, the operation member 40 is attached to the housing 24. The first cover member 36a and the second cover member 36b have an engagement portion 362a and an engagement portion 362b, respectively, each of which is capable of catching the catching portion 40c. A tag 41 can be attached to the outer surface of the main body 40a opposite to the inner surface, which faces the housing 24. The operation member 40 thus functions as a display plate of the electromagnetic valve 10.

Figure 9:
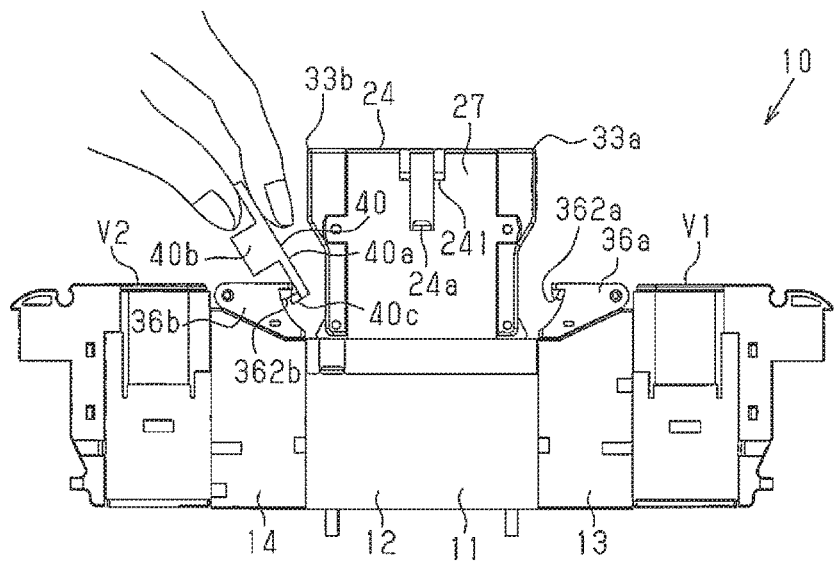
FIG. 9 is a side view showing a state in which the second cover member is operated using an operation member of the electromagnetic valve of FIG. 7.

With reference to FIG. 9, to operate the first cover member 36a and the second cover member 36b, the operation member 40 is detached from the housing 24 by the operator. The catching portion 40c is then engaged with either the engagement portion 362a or the engagement portion 362b before operating the operation member 40 to pivot the corresponding one of the first cover member 36a and the second cover member 36b. In this manner, even when the space for operating the first or second cover member 36a, 36b cannot be created, the first or second cover member 36a, 36b can be operated using the operation member 40. This facilitates operation of the first and second cover members 36a, 36b.

In the illustrated embodiments, for example, one of the two attachment screws 24a may be arranged on the opposite side of the first substrate 26a from the first pressure sensor 25a, and the other one of the attachment screws 24a may be arranged on the opposite side of the second pressure sensor 25b from the second pressure sensor 25b.

In the illustrated embodiments, the outer side surface 38a, 38b of each of the first and second adapters 33a, 33b may extend toward the spacer 23 in the same manner as the imaginary planes L1, L2 represented in FIG. 6. In other words, the outer side surface 38a, 38b of each of the first and second adapters 33a, 33b does not necessarily have to have the inclined surface section 382a, 382b or the second surface section 383a, 383b, which functions as the escape portion that prevents the outer side surface 38a, 38b from contacting the corresponding first or second cover member 36a, 36b when the first or second cover member 36a, 36b pivots. In this case, both the first cover member 36a and the second cover member 36b must be separated from the housing 24 such that, when the first or second cover member 36a, 36b pivots, the first or second cover member 36a, 36b does not interfere with the outer side surface 38a, 38b of the corresponding one of the first and second adapters 33a, 33b.

In the illustrated embodiments, the first cover member 36a and the second cover member 36b may be omitted.

In the illustrated embodiments, the electromagnetic valve 10 may be a single-solenoid type in which a single pilot valve portion is mounted. In this case, a single piston, a single piston chamber, a single pilot pressure acting chamber, a single manual shaft, and a single cover member are arranged on a single side of the electromagnetic valve 10.

The invention claimed is:

1. An electromagnetic valve comprising:
a valve casing, which has a valve hole;
a spool valve, which is accommodated in the valve hole in a reciprocally movable manner;
a supply port, a first output port, a second output port, and a discharge port, which each communicate with the valve hole;
a first pressure introduction hole, which communicates with the first output port;
a second pressure introduction hole, which communicates with the second output port;
a first pressure sensor, which is fitted in the first pressure introduction hole and is configured to detect a pressure of a fluid output from the first output port;
a second pressure sensor, which is fitted in the second pressure introduction hole and is configured to detect a pressure of a fluid output from the second output port;
a first sealing member, which is arranged between the first pressure sensor and an inner wall surface of the first pressure introduction hole;

a second sealing member, which is arranged between the second pressure sensor and an inner wall surface of the second pressure introduction hole;

a first substrate, on which the first pressure sensor is mounted;

a second substrate, on which the second pressure sensor is mounted; and a housing, which accommodates the first substrate and the second substrate, has the first pressure introduction hole and the second pressure introduction hole, and is attached to the valve casing, wherein the first substrate and the second substrate are arranged to be opposed to each other in a state of being upright in a direction perpendicular to a movement direction of the spool valve.

2. The electromagnetic valve according to claim 1, further comprising an attachment screw for attaching the housing to the valve casing, wherein the first pressure sensor projects toward the second substrate, the second pressure sensor projects toward the first substrate, and the attachment screw is arranged between the first substrate and the second substrate.

3. The electromagnetic valve according to claim 1, wherein a piston is arranged at an axial end of the spool valve;

the valve casing has a piston chamber in which the piston is accommodated, the piston defines a pilot pressure acting chamber in the piston chamber, the spool valve is reciprocated by a pilot fluid that is selectively supplied to and discharged from the pilot pressure acting chamber, a manual shaft, which is manually operated to control supply/discharge of the pilot fluid to and from the pilot pressure acting chamber, is arranged in the valve casing, the manual shaft has a manual-operation portion, which is located beside the housing in the movement direction of the spool valve, a cover member, which covers the manual-operation portion, is pivotal about a hinge pin with respect to the valve casing, and an outer side surface of the housing that faces the cover member has an escape portion, which prevents the outer side surface from contacting the cover member when the cover member pivots.

4. The electromagnetic valve according to claim 3, further comprising an operation member, which is used to operate the cover member.

* * * * *